(12) United States Patent
Barker et al.

(10) Patent No.: US 8,401,353 B2
(45) Date of Patent: Mar. 19, 2013

(54) OPTICAL FIBER CABLE ASSEMBLY

(75) Inventors: Jeffrey Scott Barker, Statesville, NC (US); Paul Randall Baird, Hickory, NC (US); Thomas Andrew Rasmussen, III, Taylorsville, NC (US)

(73) Assignee: Draka Comteq B.V., Amsterdam (NL)

( * ) Notice: Subject to any disclaimer, the term of this patent is extended or adjusted under 35 U.S.C. 154(b) by 332 days.

(21) Appl. No.: 12/557,055

(22) Filed: Sep. 10, 2009

(65) Prior Publication Data

US 2010/0092135 A1  Apr. 15, 2010

Related U.S. Application Data

(60) Provisional application No. 61/096,545, filed on Sep. 12, 2008, provisional application No. 61/139,228, filed on Dec. 19, 2008.

(51) Int. Cl.
  *G02B 6/44* (2006.01)
(52) U.S. Cl. .................. 385/110; 385/105; 385/113
(58) Field of Classification Search .................. 385/105, 385/110, 113
  See application file for complete search history.

(56) References Cited

U.S. PATENT DOCUMENTS

| | | | |
|---|---|---|---|
| 4,859,223 A | 8/1989 | Kajioka et al. |
| 5,627,932 A | 5/1997 | Kiel et al. |
| 5,761,362 A | 6/1998 | Yang et al. |
| 5,852,698 A | 12/1998 | Bringuier |
| 5,903,693 A | 5/1999 | Brown |
| 5,911,023 A | 6/1999 | Risch et al. |
| 6,278,831 B1 | 8/2001 | Henderson et al. |
| 6,292,611 B1 | 9/2001 | Chamberlain et al. |
| 6,389,204 B1 | 5/2002 | Hurley |
| 6,389,214 B1 | 5/2002 | Smith et al. |
| 6,579,014 B2 | 6/2003 | Melton et al. |
| 6,594,427 B1 | 7/2003 | Dixon et al. |
| 6,648,520 B2 | 11/2003 | McDonald et al. |
| 6,771,861 B2 | 8/2004 | Wagner et al. |
| 7,035,510 B2 | 4/2006 | Zimmel et al. |
| 7,270,485 B1 | 9/2007 | Robinson et al. |
| 7,272,282 B1 | 9/2007 | Seddon et al. |

(Continued)

FOREIGN PATENT DOCUMENTS

| EP | 1361465 A1 | 11/2003 |
|---|---|---|
| EP | 1515171 A1 | 3/2005 |
| EP | 2163928 A2 | 3/2010 |

OTHER PUBLICATIONS

European Search Report in counterpart European Application No. 09011651 dated Aug. 11, 2010.

(Continued)

*Primary Examiner* — Jerry Rahll
(74) *Attorney, Agent, or Firm* — Summa, Addition & Ashe, P.A.

(57) ABSTRACT

The present invention provides optical fiber communication cable assemblies useful for separating and conveying individual fibers from a multiple optical fiber cable to connectors in a protective manner. The optical fiber cable assembly is suitable for outdoor use and includes a (i) cable with multiple optical fibers; (ii) a furcation unit attached to the cable for directing individual optical fibers from the cable to furcation legs; and (iii) multiple furcation legs receiving at least one of the optical fibers. The furcation legs include (i) a buffer tube surrounding the optical fiber; (ii) strength members surrounding the buffer tube; and (iii) a jacket surrounding the strength members. The furcation legs typically exhibit a tensile rating of at least about 50 pounds ($lb_f$), more typically 100 pounds ($lb_f$) or more. Moreover, the furcation legs typically exhibit total shrinkage of less than about 2 percent when cycled from +23° C. to −40° C. to +70° C. to −40° C.

38 Claims, 6 Drawing Sheets

U.S. PATENT DOCUMENTS

| | | | |
|---|---|---|---|
| 7,280,725 | B2 | 10/2007 | Brown et al. |
| 7,391,944 | B2 | 6/2008 | Storaasli et al. |
| 2002/0001443 | A1 | 1/2002 | Bringuier |
| 2002/0168155 | A1 | 11/2002 | Rossi et al. |
| 2003/0026919 | A1 | 2/2003 | Kojima et al. |
| 2003/0099446 | A1 | 5/2003 | Witt et al. |
| 2005/0031276 | A1 | 2/2005 | Zimmel et al. |
| 2005/0228062 | A1 | 10/2005 | Wolf et al. |
| 2005/0234145 | A1 | 10/2005 | Sitzmann et al. |
| 2005/0241820 | A1 | 11/2005 | Wasserman et al. |
| 2005/0276551 | A1 | 12/2005 | Brown et al. |
| 2007/0047884 | A1 | 3/2007 | Storaasli et al. |
| 2007/0214841 | A1 | 9/2007 | Pedrido |
| 2008/0138026 | A1 | 6/2008 | Yow et al. |
| 2010/0067857 | A1 | 3/2010 | Lovie et al. |
| 2010/0092135 | A1 | 4/2010 | Barker et al. |
| 2010/0092140 | A1 | 4/2010 | Overton |

OTHER PUBLICATIONS

Corning, "Installing a Furcation Kit on a Composite Drop Cable," SRP-006-110, Issue 4, Nov. 2003, pp. 1-4, Corning Cable Systems LLC, Hickory, NC.

Draka, Product specification for "ezDrop Flat Cable—Connectorized," Issue Date: May 21, 2009, Claremont, NC, pp. 1-2.

Corning, product specification for "OptiTap Connector," EVO-592-EN, Corning Cable Systems LLC, Hickory, NC, Sep. 2005, pp. 1-2.

English translation of Chinese Office Action in counterpart Chinese Application No. 200910169041.2 dated Jun. 5, 2012, pp. 1-4.

FIG. 4
Shrinkage of Furcation Unit Materials at 85°C

FIG. 5
Coefficient of Thermal Expansion For Furcation Unit Materials

OPTICAL FIBER CABLE ASSEMBLY

CROSS REFERENCE TO PRIORITY APPLICATIONS

This application claims the benefit of U.S. Patent Application No. 61/096,545 for an "Optical Fiber Cable Assembly" (filed Sep. 12, 2008), and U.S. Patent Application No. 61/139,228 for an "Optical Fiber Cable Assembly" (filed Dec. 19, 2008), each of which is incorporated by reference in its entirety.

FIELD OF THE INVENTION

This invention relates generally to optical fiber cable assemblies and, more particularly, to optical fiber cable assemblies for separating and conveying individual fibers from a multiple optical fiber cable to connectors in a protective manner.

BACKGROUND OF THE INVENTION

Optical fiber systems are well known and offer several advantages, including a high bandwidth for signal transmission, low noise operation, and inherent immunity to electromagnetic interference. Because of these advantages, optical fibers are increasingly used in a variety of communications applications, including voice, video, and data transmissions.

Outdoor-use optical fiber cable frequently includes optical fibers enclosed within a buffer tube and surrounded by an external jacket to protect the optical fibers from environmental conditions. In addition, an optical fiber cable intended for outdoor use can further include longitudinally positioned reinforcing members, typically in the form of longitudinally extending rods, to provide tensile strength and structural rigidity along the length of the cable. The reinforcing members can limit axial tensile strain of the cable resulting from tensile forces, such as can occur during cable installation. The reinforcing members can also limit the axial thermal strain of the cable when the cable is subject to significant changes in temperature.

Optical fibers used for voice, data, and video transmission typically include a glass core, where the majority of the light signal travels, and a surrounding glass cladding, which serves as a waveguide to keep the light traveling axially in the core (i.e., because of the refractive-index differences between the glass cladding and the glass core). The glass core and cladding are surrounded by one or more polymeric coatings, which offer mechanical protection to the underlying glass cladding and glass core. Two or three protective coating layers are most common. In this regard, the innermost coating used is typically softer, relatively low modulus polymeric material to buffer the glass cladding and core from mechanical stresses. The outer coating is typically a higher modulus secondary coating that provides mechanical protection while facilitating handling of the optical fiber over the cabling, installation, and operating life of the optical fiber.

To effectively use optical fibers in a transmission system, there is a need to make connections of optical fibers at various points in the network. Examples of connection points that are commonly needed are (i) connections of individual optical fiber cable lengths to create a longer continuous optical fiber, (ii) connections to create branching points that reroute fibers in the same cable in different directions as needed to provide fibers at desired locations, and (iii) connections of active and passive components, such as (a) LEDs and lasers, which create the optical signals, (b) amplifiers and attenuators to increase or reduce the signal power, respectively, (c) detectors to detect and interpret the optical signals, and (d) optical splitters to multiply the number of optical signals.

Optical fiber connections are normally made by (i) fusion splicing where two ends of the optical fibers are welded together at glass contact points (and a protective sleeve placed over the weld point); (ii) mechanical splices where the two ends of fibers being joined are coupled together with a mechanical apparatus; or (iii) mechanical connectors where the two ends of fibers are coupled together with a mechanical apparatus. Those having ordinary skill in the art will appreciate that a mechanical connector is different from a mechanical splice in that the joining apparatus is designed to be connected, disconnected, and reconnected multiple times over the useful life of a connector while providing a high-quality, low-added-loss, low-optical-reflection joint between the connected optical fibers. In contrast, a mechanical splice is typically designed to be connected once and then stored over its operating life.

Historically, fusion-splicing joining technology has been preferred for connections made outdoors (i.e., in the outside-plant environment) because of the low power loss at the joint, the low signal reflection at the joint, and the permanency and long-term reliability of this welding technology. Fibers that are joined by fusion splicing machines must have a minimal fiber length of a few feet extending from the cable structure to facilitate placement into the fusion splicing machine for the welding process.

In order to keep fibers grouped in units for easier storage and handling, small, flexible, non-UV-resistant furcation tubes are placed over most of the length of extended fiber. These conventional furcation tubes are typically solid or spiral low-modulus polymeric tubes that provide a flexible means for grouping and handling fibers while providing little protection. Alternatively, in the case of some stranded loose-tube optical-fiber-cable designs, the buffer tube containing the fiber can be extended from the cable along with the fiber to provide the same fiber grouping and handling benefits with very limited protection (i.e., because of the low modulus of the tubes). These furcation or buffer tubes are then stored along with the fusion splice in a protective plastic or metallic enclosure to provide adequate protection from outdoor elements (e.g., extreme temperatures, wind, rain, snow, ice, and solar UV radiation).

Active and passive components have been conventionally located inside of buildings, remote terminals, or protective cabinets for protection from outdoor elements that can occur in the outside-plant environments. It has been common practice to utilize mechanical connectors in these more protective environments to make the necessary connections of optical fibers to other optical fibers or to active and passive components. Optical connectors are especially attractive when there is a likelihood of disconnecting and reconnecting optical fibers. Similar to the fusion splice situation, a length of fiber typically extends from the cable structure to allow both the installation of the connector and the routing of the connector to the appropriate position for the connection to be made. Also similar to fusion splices, this extended length of fiber is typically provided some limited protection by a furcation tube, which is subsequently stored in a protective cabinet or enclosure.

The mating ends of connectors may be installed onto the fiber ends either in the field (e.g., at the network location) or in a factory prior to installation into the network. The advantage of installing the mating ends of the connectors in a factory is that the connector installation process can be made faster, less expensively, and with a higher quality in a manufacturing environment than in a field environment. In the field, the ends of the connectors are mated in order to connect the fibers together or connect the fibers to passive or active components.

The advent of a market for high-bandwidth communication services/content to the home (e.g., high speed Internet access, cable television, high-definition television (HDTV), and video-on-demand) has created the need to reduce the costs and complexity of installing FTTH (Fiber-to-the-Home) networks. Ruggedized connectors have been developed as one way to accomplish lower cost and less complex FTTH networks.

Ruggedized optical fiber connectors are defined as optical fiber connectors that are designed for long-term performance in the outdoors (i.e., the outside-plant environment) without requiring enclosures, cabinets, or buildings for adequate protection from the outdoor elements (e.g., extreme hot and cold temperatures, solar UV radiation, rain, ice, snow, and wind).

The cost of FTTH network deployment can be reduced by initially installing the feeder and distribution cables of the network and subsequently making connections from the distribution cable to the home with pre-connectorized drop cables utilizing ruggedized connectors. This allows the cost of the last connection to be realized at the time the customer purchases the service (Internet access, cable television, HDTV, and video-on-demand).

Ruggedized connectors offer the benefit of making connections/disconnections at different times as needed to provide communications service without the capital equipment costs, operator skill level, and labor cost required for fusion splicing machines. Moreover, ruggedized connectors, unlike traditional connectors, do not require enclosures, cabinets, or terminals for protection from the outdoor elements, thereby further alleviating costs.

One example of such a ruggedized connector is the OPTI-TAP™ brand connector, commercially available from Corning Cable Systems. Ruggedized connectors can be installed directly onto single fiber cables making a connectorized cable assembly capable of reliable performance in the outside-plant environment without additional protection. In this regard, U.S. Pat. No. 6,579,014 disclosing a fiber optic receptacle and U.S. Pat. No. 6,648,520 disclosing a fiber optic plug are hereby incorporated by reference in their entirety.

For connectorized cables of higher fiber counts, however, there is a need to add a furcation tube between the end of the cable and the ruggedized connector. Furcation tubes allow multiple ruggedized connectors to extend from a multi-fiber drop cable. The currently available buffer tubes in loose tube cables and commercially available furcation tubes do not adequately protect the length of fiber extending from the cable to the ruggedized connector in the outdoor environment. Multi-fiber cables using currently available technology would require additional enclosures, cabinets, terminals, or buildings to adequately protect this furcated section of the assembly, thereby diminishing the benefit of ruggedized connectors.

SUMMARY OF THE INVENTION

The present invention provides optical fiber cable assemblies, which are useful in various communication systems, to transition multiple optical fibers present in an outdoor-use cable into individual optical fibers (e.g., with connectorized ends). In one aspect, the optical fiber cable assembly of the present invention includes a cable suitable for outdoor use, such as a drop cable having multiple optical fibers; a furcation unit attached to an end of the cable for directing individual optical fibers from the outdoor cable into corresponding furcation legs; and multiple furcation legs, each having an end attached to the furcation unit and each typically receiving at least one of the optical fibers.

The furcation legs further include (i) a buffer tube surrounding at least one of the optical fibers, (ii) strength members surrounding the buffer tube, and (iii) a protective jacket surrounding the strength members. The furcation legs of the present invention exhibit improved tensile properties and can have a tensile rating of at least about 50 pounds ($lb_f$), such as 75-100 pounds ($lb_f$) or more.

Despite significantly improved tensile properties, the furcation legs of the present invention may also have small diameters. In various exemplary embodiments, the furcation legs can possess, for example, a jacket outer diameter of up to about 5.0 millimeters and a buffer tube outer diameter of up to about 2.0 millimeters. The inner diameter of the buffer tube is designed such that the optical fiber can be inserted into the tube over several feet during the assembly of a furcation leg and its ruggedized connector. Thus, the furcation legs of the present invention can be readily connectorized to various optical connectors and yet still exhibit desirable tensile properties.

The furcation legs of the present invention further exhibit other desirable properties for outdoor applications. For example, the furcation legs can exhibit minimal or reduced longitudinal shrinkage when exposed to the extreme temperatures and/or temperature cycling encountered in some outdoor installations.

In various exemplary embodiments of the present invention, the jacket and/or the buffer tube of one or more furcation legs may be formed of a polyolefin copolymer, such as a nucleated polypropylene-polyethylene copolymer, having improved dimensional stability so that the furcation legs can exhibit a post-extrusion shrinkage of about 0.5 percent or less when cycled from room temperature (23° C.) to 85° C. and back to room temperature (23° C.). Additionally, the furcation leg's total shrinkage (e.g., including post-extrusion shrinkage and thermal expansion) when cycled from room temperature to −40° C. to +70° C. to −40° C. is less than about two percent, typically less than about 1.5 percent (e.g., less than about 1.25 percent), and more typically less than about one percent (e.g., about 0.9 percent or so).

The furcation legs of the assembly also can exhibit reduced degradation upon exposure to ultraviolet (UV) radiation. In this regard, the jacket of each furcation leg may include a UV-stabilizing agent, such as carbon black.

The strength members of the furcation legs may be formed of any suitable high-strength material, such as aramid material (i.e., aromatic polyamides), fiberglass, polyester material, or a combination thereof. In exemplary embodiments of the present invention, the strength members may be aramid yarn helically wound about a buffer tube. Such flexible strength members can provide tensile strength needed to survive outdoor environmental factors (e.g., wind, ice, snow, and rain) without substantially diminishing or reducing the flexibility of the furcation leg. This flexibility facilitates ease of handling for making connections and disconnections of the ruggedized connectors. The combination of a furcation leg's buffer tube, strength elements, and outer jacket can also provide protection to the optical fiber from compression forces resulting from handling, as well as from the outdoor elements (e.g., rain, sleet, snow, and wind).

Thus, in contrast to conventional furcation tubing, the furcation legs of the present invention can provide sufficient strength, protection, and structural rigidity along the length of the optical fibers so that the furcated optical fibers are suitable for many outdoor applications. Yet despite the improved tensile and structural properties, the furcation legs still exhibit sufficient flexibility so that the legs can be readily connectorized and used in confined spaces in the field.

The furcation legs of the assembly of the present invention may further include a suitable water-blocking or water-absorbing material. In exemplary embodiments of the present invention, the strength members of the furcation legs may be impregnated or coated with water-swellable particles.

An exemplary embodiment of the present invention is a drop cable assembly that includes a plurality of furcation legs, each including: a single optical fiber; a buffer tube with an outer diameter of about 2.0 millimeters surrounding the optical fiber, the buffer tube being formed from a nucleated polypropylene copolymer material and exhibiting a post-extrusion shrinkage of less than about 0.5 percent; aramid yarn strength members coated or impregnated with a water-swellable material surrounding the buffer tube; a jacket surrounding the strength members with an outer diameter of about 4.8 millimeters, the jacket being formed from a UV-stabilized nucleated polypropylene copolymer material and exhibiting a post-extrusion shrinkage of less than about 0.5 percent; and an optical connector attached to an end of the furcation leg.

The foregoing, as well as other characteristics and advantages of the present invention, and the manner in which the same are accomplished, are further specified within the following detailed description and its accompanying drawings.

DETAILED DESCRIPTION

The present invention now will be described more fully hereinafter with reference to the accompanying drawings, in which some, but not all, embodiments of the present invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

The terminology used herein is for the purpose of describing particular embodiments only and is not intended to be limiting of the present invention. As used herein the term "and/or" includes any and all combinations of one or more of the associated listed items. As used herein, the singular forms "a," "an" and "the" are intended to include the plural forms as well, unless the context clearly indicates otherwise.

Embodiments of the present invention are described herein with reference to various perspectives thereof, including perspective, transverse, and cross-sectional views that are schematic illustrations of idealized embodiments of the present invention. As such, variations from the shapes of the illustrations, such as resulting from manufacturing techniques and/or tolerances, are to be expected. Thus, embodiments of the present invention should not be construed as limited to the particular shapes of regions illustrated herein but are to include deviations in shapes that result, for example, from manufacturing. Thus, the regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Figure 1:
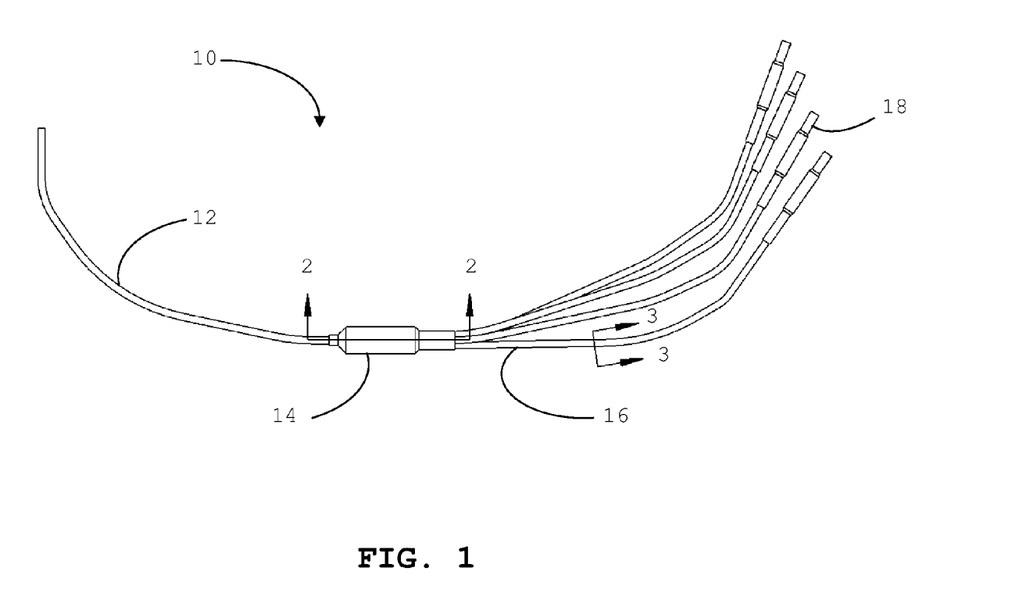
FIG. 1 schematically depicts a perspective view of an exemplary embodiment of an optical fiber cable furcation assembly according to the present invention.

Referring now to FIG. 1, a perspective view of an exemplary embodiment of a multiple optical fiber cable assembly is shown. The multiple optical fiber cable assembly, designated at 10 in FIG. 1, includes a cable 12, a furcation unit 14, and multiple furcation legs 16.

The cable assembly 10 may further include multiple connectors 18. Exemplary connectors include without limitation OPTITAP™ brand connectors, which are commercially available from Corning Cable Systems.

The cable 12 is designed to include an optical transmission component. In exemplary embodiments of the present invention, the optical transmission component may include a buffer tube surrounding a plurality of optical fibers. The cable 12 further includes a suitable jacket surrounding the optical transmission component and one or more longitudinally positioned strength members (e.g., two strength members) disposed between the buffer tube and the jacket.

As is known in the art, the optical fibers may be loose or joined in some manner, such as in the form of one or more optical-fiber ribbons. Those having ordinary skill in the art will appreciate that the kinds and numbers of optical fibers, as well as the manner in which the optical fibers are arranged, may vary without departing from the scope of the present invention.

In an exemplary embodiment of the present invention, the cable 12 may be a drop cable. Any suitable drop cable may be used in accordance with the present invention, including drop cables in which a rectangular jacket has two broad opposing sides (e.g., top and bottom) that are wider than the other two opposing sides (e.g., left and right). In this embodiment of the present invention, the cable 12 may further include two strength members that are disposed lengthwise on opposing sides of the optical transmission component (e.g., a buffer tube surrounding a plurality of optical fibers). It will be understood, of course, that the present invention is not so limited and further may include embodiments including just one strength member or more than two strength members.

The buffer tube(s) and/or the jacket of cable 12 may be independently formed of any suitable material known in the art for such components, including, without limitation, polyolefins such as polypropylene and polyethylene (including high-density polyethylene (HDPE), medium-density polyethylene (MDPE), low-density polyethylene (LDPE), and linear low-density polyethylene (LLDPE)); polyamides; polyesters, such as polybutylene terephthalate (PBT); and other commercially available polymers, as well as blends and copolymers thereof (including multicomponent copolymers, such as ter-polymers).

Exemplary polyolefin materials suitable for use in the jacket and/or the buffer tube of furcation legs 16 are disclosed, for example, in U.S. Pat. No. 5,761,362 to Yang et al. (issued Jun. 2, 1998) and U.S. Pat. No. 5,911,023 to Risch et al. (issued Jun. 8, 1999), each of which is hereby incorporated by reference in its entirety.

The polymeric materials forming the components of the cable assembly 10 (e.g., the buffer tubes and/or the jacket of cable 12) may include additives, such as nucleating agents, flame-retardants, smoke-retardants, antioxidants, UV absorbers, and/or plasticizers. For example, the various jacketing and buffer-tube materials may be enhanced with UV stabilizers and flame-retardants additives (e.g., so that the particular cable assembly component meets the requirements of the National Electrical Code).

The strength members, which may made of a metallic or a dielectric material, such as glass-reinforced plastic, may take the form of a rod or braided/helically wound wire or strength fibers.

The cable 12 may include additional components that may be readily selected by those having ordinary skill in the art. As a non-limiting example, buffer tube(s) may be gel-filled or have dry water-blocking elements, such as water-swellable tape or water-swellable yarns. Within a furcation leg 16, a buffer tube may be surrounded with a plurality of strength yarns and/or water-blocking and/or water-swellable materials. By way of example, water-swellable tapes and water-swellable yarns may include fabrics or yarns carrying or impregnated with a water-swellable material, such as water-swellable particulate powders, and may also include fabrics or yarns formed from water-swellable polymeric fibers.

Drop cables useful in the present invention are commercially available and include without limitation drop cables, such as disclosed in commonly assigned U.S. Patent Application Publication No. 2007/0047884 (published Mar. 1, 2007), now U.S. Pat. No. 7,391,944, each of which is hereby incorporated by reference in its entirety.

As depicted in FIG. 1, the furcation unit 14 connects an end of the cable 12 to ends of multiple furcation legs 16 (i.e., tubes). As discussed herein, the furcation unit 14 serves to direct and transition individual optical fibers from the cable 12 into corresponding furcation legs 16 (e.g., on a one-to-one basis).

Figure 2:
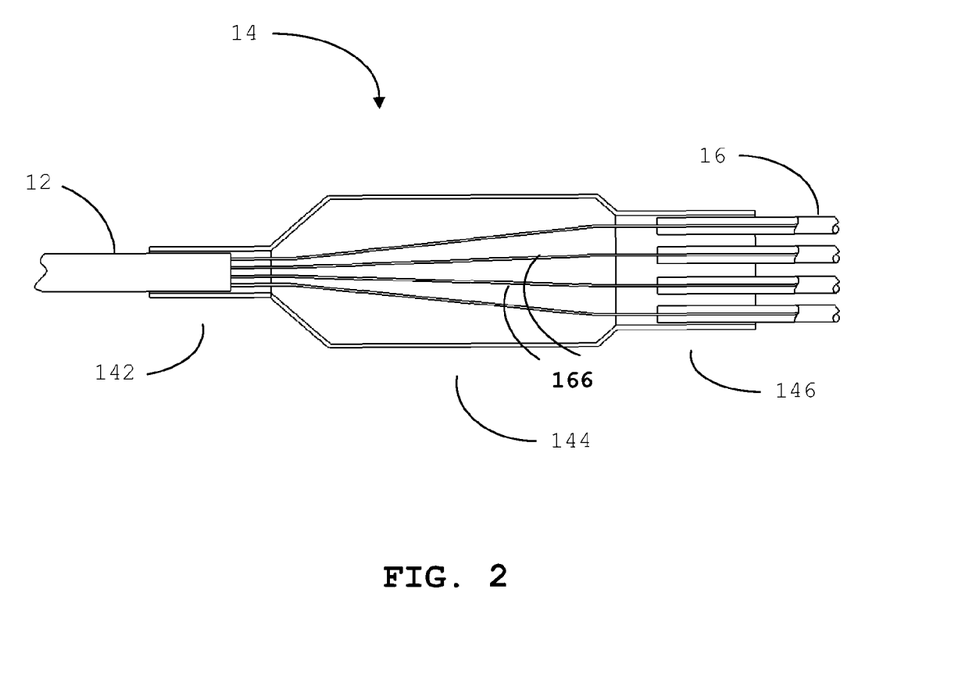
FIG. 2 schematically depicts a transverse sectional view of the furcation assembly of the present invention along line 2-2 of FIG. 1.

FIG. 2, a transverse section of the cable assembly 10 taken along line 2-2 of FIG. 1, schematically illustrates the furcation unit 14 and the transition of optical fibers from the cable 12 into the furcation legs 16. Referring to FIG. 2, the furcation unit 14 includes a first end 142, a second end 146, and a central portion 144. The various components of the cable 12 as described previously are inserted through the first end 142 of the furcation unit 14 and into the central portion 144 of the furcation unit.

The central portion 144 of the furcation unit 14 is structured to transition the plurality of optical fibers 166 into a plurality of furcation legs or tubes 16. In this manner, the furcation unit 14 directs individual optical fibers 166 from the cable 12 to corresponding individual furcation legs 16 so that each furcation leg 16 includes at least one, and typically only one, optical fiber 166. The furcation legs 16 emerge from (e.g., exit through) the second end 146 of the furcation unit 14.

The furcation unit 14 helps to reduce the risk of damaging the optical fibers 166 during handling, because the furcation unit 14 can reduce the tensile forces to which the optical fibers 166 would otherwise be subjected. The furcation unit 14 is also structured to prevent water from entering the cable assembly 10.

The cable assembly of the present invention is not limited to any particular kind of furcation unit. An exemplary furcation unit useful in the present invention is the cable transition member of the ezDROP™ brand connectorized flat cable assembly, commercially available from Draka.

Figure 3:
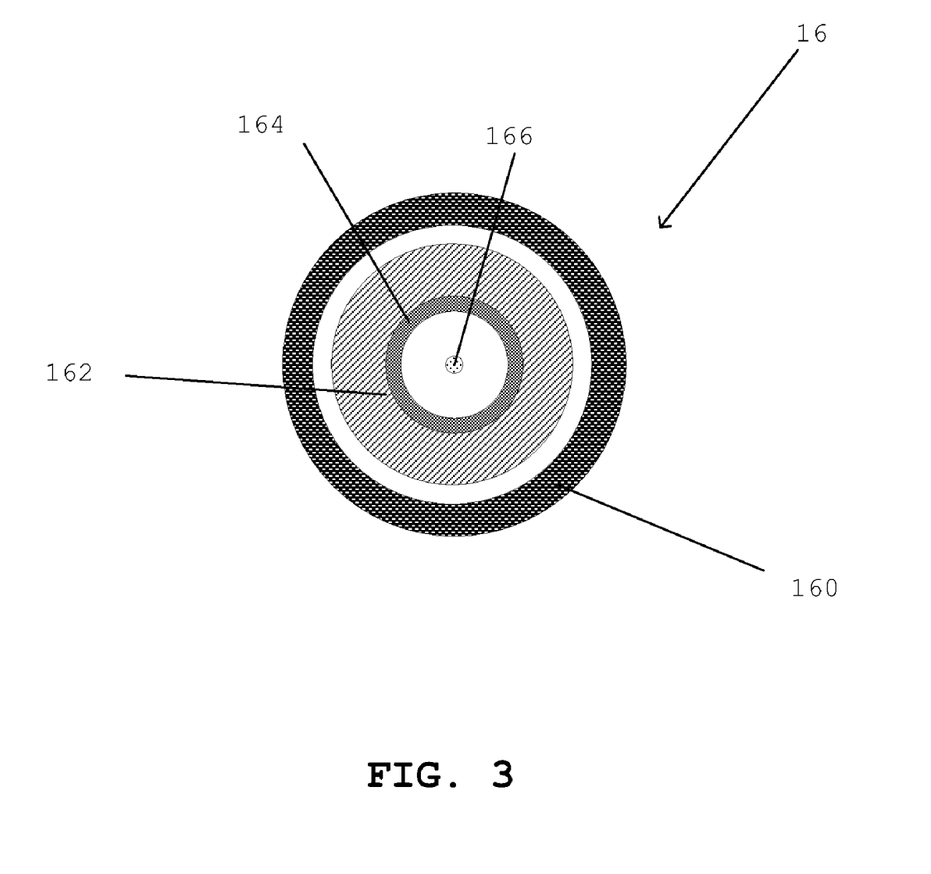
FIG. 3 schematically depicts a cross-sectional view of an exemplary furcation leg of the furcation assembly along line 3-3 of FIG. 1.

FIG. 3 depicts a schematic cross-sectional view of a furcation leg 16 (taken along line 3-3 of FIG. 1) in accordance with an exemplary embodiment of the present invention. The individual furcation leg 16 includes a jacket 160, a buffer tube 164 disposed inside the jacket 160, and strength members 162 positioned between the jacket 160 and the buffer tube 164. The buffer tube 164 surrounds an optical fiber 166 received from the cable 12. Each furcation tube 16 typically includes a single optical fiber, although the present invention is not so limited.

The jacket 160 may include ultraviolet (UV) stabilizing agents to protect the legs from degradation upon exposure to UV radiation. Any kind of UV-stabilizing agents known on the art may be used in accordance with various embodiments of the present invention. Non-limiting examples of UV-stabilizing agents suitable for use in the jacket 160 of a furcation leg 16 may include ultraviolet absorbers, quenchers, and hindered-amine light stabilizers, such as but not limited to hydroxybenzotriazoles, hydroxybenzophenones, carbon black, and the like, as well as combinations thereof. UV-stabilizing agents may be present in the jacket 160 in conventional amounts.

Also as noted, the strength members 162 of the furcation legs may be formed of any suitable strength material, such as aramid yarns, fiberglass, polyester yarns, or a combination thereof. For example, in one embodiment of the present invention, the strength members 162 may include one or more layers of aramid yarn helically wound around the buffer tube 164. The present invention is not so limited, however, and accordingly the strength members 162 may be present in alternative arrangements (e.g., longitudinally disposed within the respective furcation legs). The strength members 162 can not only provide tensile strength but also can cushion compression and impact loads.

As noted, the furcation legs 16 may include suitable water-blocking or water-absorbing materials (e.g., dry water-blocking elements, such as water-swellable tapes or water-swellable yarns). Water-swellable tapes and water-swellable yarns may include fabrics or yarns carrying or impregnated with a water-swellable material, such as water-swellable particulate powders. Water-swellable tapes and water-swellable yarns may also include fabrics or yarns formed from water-swellable polymeric fibers.

In exemplary embodiments of the present invention, the strength members 162 (e.g., aramid yarns) are impregnated or coated with a water-swellable material, such as water-swellable particles. Exemplary water-swellable particles include super absorbent polymers (SAPs), such as particulates of sodium polyacrylate, polyacrylate salt, or an acrylic acid polymer with a sodium salt.

In contrast to conventional furcation tubing, the furcation legs of the present invention exhibit, among other features, improved tensile properties, resistance to thermal expansion and contraction, and resistance to UV degradation. These properties facilitate the use of the cable assembly 10 in outdoor and other demanding environments (e.g., industrial production facilities).

For example, at least one, and typically each, furcation leg 16 of the cable assembly 10 can exhibit high-tensile-load bearing properties when an axial force is applied thereto, under both short-term (e.g., during installation) and long-term (e.g., post-installation) conditions.

In exemplary embodiments of the present invention, a furcation leg 16 can exhibit a short-term load (e.g., designed mainly for handling during the connection or disconnection process) tensile rating of at least about 50 pounds ($lb_f$), typically at least about 75 pounds ($lb_f$), and more typically at least about 100 pounds ($lb_f$) (e.g., about 100 to 150 pounds, such as between about 110 and 125 pounds) as determined using Telcordia Technologies GR-3120 Core 4.3.3 Proof test. The present invention, however, is not limited to the tensile rating disclosed herein. In this regard, the tensile rating of the furcation legs of the invention can be increased, for example, by incorporating additional strength components.

Despite the improved tensile properties of the furcation legs 16, the furcation legs 16 can still possess a diameter suitable for use with many optical connectors, which typically have relatively small diameters as compared with the diameter of the cable (such as drop cable 12) entering a furcation unit. For example, the buffer tube 164 can have an outer diameter (OD) ranging from about 1.3 millimeters (mm) to about 3 millimeters (e.g., about 1.5 to 2.5 millimeters), and the jacket 160 may have an outer diameter (OD) ranging from about 4 millimeters to about 6 millimeters. In an exemplary embodiment of the present invention, the buffer tube 164 may have an outer diameter of about 2.0 millimeters and the jacket 164 may have an outer diameter of about 4.8 millimeters.

Moreover, despite their improved tensile and structural properties, the furcation legs 16 still exhibit sufficient flexibility so that the furcation legs 16 can be readily connectorized and used in the field.

Thus, in contrast to conventional furcation cables, the furcation legs 16 of the present invention can provide seemingly contradictory properties of improved tensile ratings, decreased diameters, and satisfactory flexibility, thereby making the furcation legs suitable for many outdoor applications.

The furcation legs 16 of the present invention can optionally exhibit additional beneficial properties. For example, the jacket 160 and/or the buffer tube 164 of a furcation leg 16 may be formed of a polymeric material having excellent thermal expansion properties. The jacket 160 and/or the buffer tube 164, for example, may be independently formed of polyolefins, such as polypropylene, polyethylene, and blends and copolymers thereof (including multicomponent copolymers, such as ter-polymers). In one exemplary embodiment, the furcation-leg jackets 160 include flame-retardants but the enclosed buffer tubes 164 do not.

In exemplary embodiments of the present invention, the jacket 160 and/or the buffer tube 164 are formed from nucleated polypropylene-polyethylene copolymers and possess improved dimensional stability. In this regard, the furcation legs 16 can exhibit post-extrusion shrinkage of less than about 0.5 percent (e.g., less than about 0.4 percent, such as less than about 0.3 percent) when cycled from room temperature (23° C.) to 85° C. and back to room temperature (23° C.).

Additionally, the total shrinkage of the furcation legs (e.g., considering both post-extrusion shrinkage and thermal expansion) when cycled from room temperature to −40° C. to +70° C. to −40° C. can be less than 1 percent (e.g., about 0.9 percent or less). Because the furcation legs can have these shrinkage properties, the furcation legs are capable of withstanding conditions between about −40° C. to about +70° C. Otherwise, such a broad temperature range can cause expansions and contractions in the furcation components, which can result in optical fiber attenuation.

In this respect, total shrinkage levels above 1 percent tend to cause attenuation increases in the connectorized fiber assembly because of shrinkage of the furcation legs and buckling of the optical fibers.

Post-extrusion shrinkage determinations were made using two methods, namely the conventional oven method and the thermo-mechanical analyzer (TMA) method, respectively.

In the conventional oven method, jacket and tube specimens were cut to lengths of 150 millimeters. Initial length ($L_i$) was measured by a micrometer and recorded. Specimens were placed on a bed of talc in aluminum pans and aged in an oven at 85° C. for four hours. After the four-hour aging period specimens were allowed to cool for one hour. The final length ($L_f$) was measured and recorded. Percent shrinkage was calculated as follows: $[(L_i-L_f)/L_i]\times 100$.

In the TMA method, a small 2-3 millimeter specimen was cut from the jacket or tube and sandwiched between quartz plates before being placed on the TMA sample stage. Initial length in z-axis was measured and recorded by the TMA instrument. Length measurements were recorded at ten data points per second while the specimen was subjected to the following temperature program: (i) equilibrate at 25° C. for 10 minutes; (ii) ramp to −40° C. at 10° C. per minute; (iii) ramp to 85° C. at a rate of 10° C. per minute; and (iv) ramp to −40° C. at a rate of 10° C. per minute. TMA data analysis software was used to calculate the shrinkage.

Figure 4:
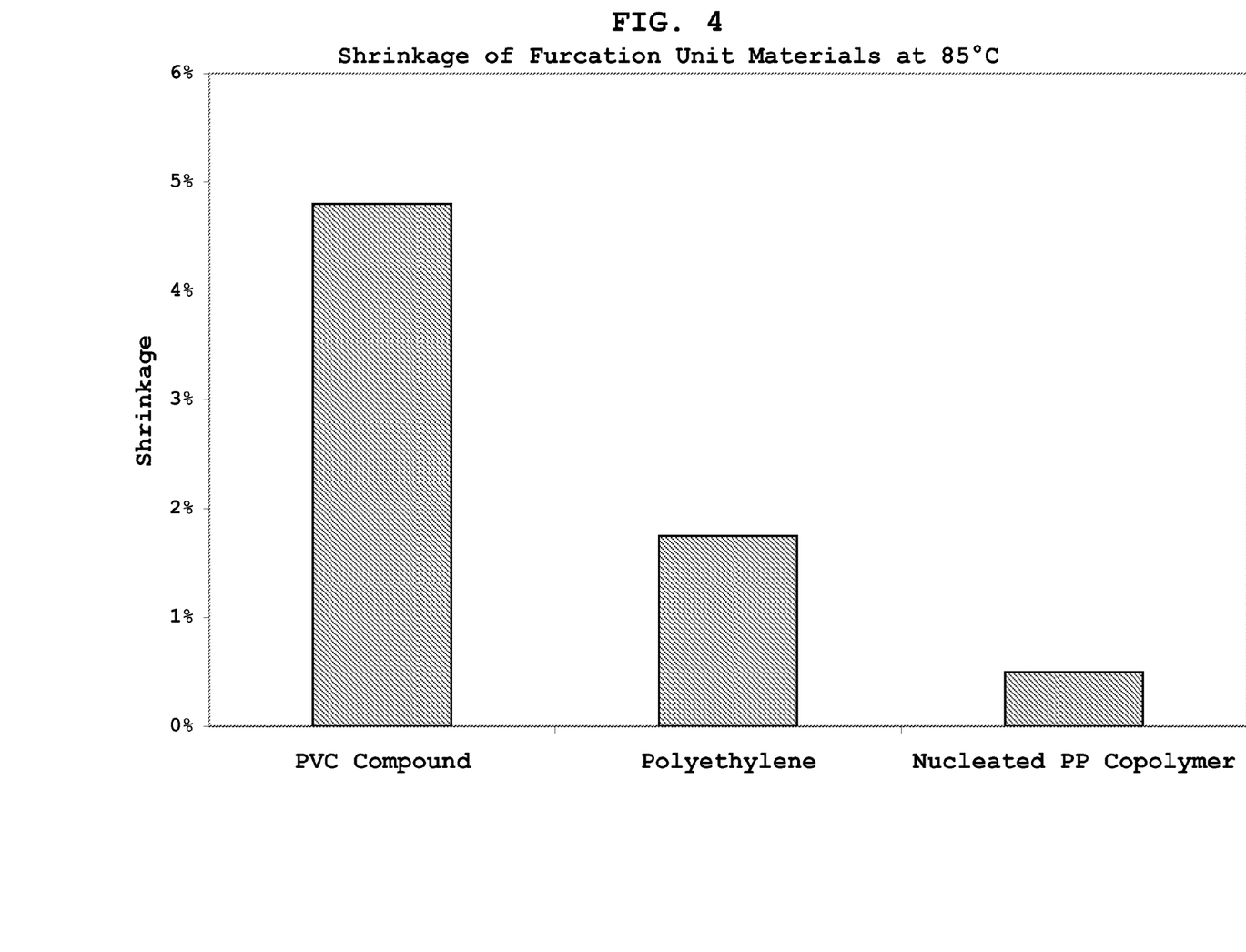
FIG. 4 graphically illustrates shrinkage values observed for a nucleated polypropylene-ethylene copolymer material as compared with polyvinyl chloride (PVC) and polyethylene materials.

Table 1 (below) and FIG. 4 illustrate characteristic shrinkage values observed for PVC, polyethylene, and a nucleated polypropylene-ethylene copolymer after heating at 85° C. for one hour.

TABLE 1

| 85° C. (for 1 hour) | PVC Compound | Polyethylene | Nucleated PP Copolymer |
|---|---|---|---|
| Shrinkage | 4.80% | 1.75% | 0.50% |

The total cable contraction at −40° C. can be dominated by post-extrusion shrinkage of the jacketing material, but the coefficient of thermal expansion (CTE) of the jacketing material may also contribute substantially. The nucleated polypropylene copolymer can also have a reduced coefficient of thermal expansion relative to alternative furcation jacketing unit compounds that are based on polyethylene or PVC.

Figure 5:
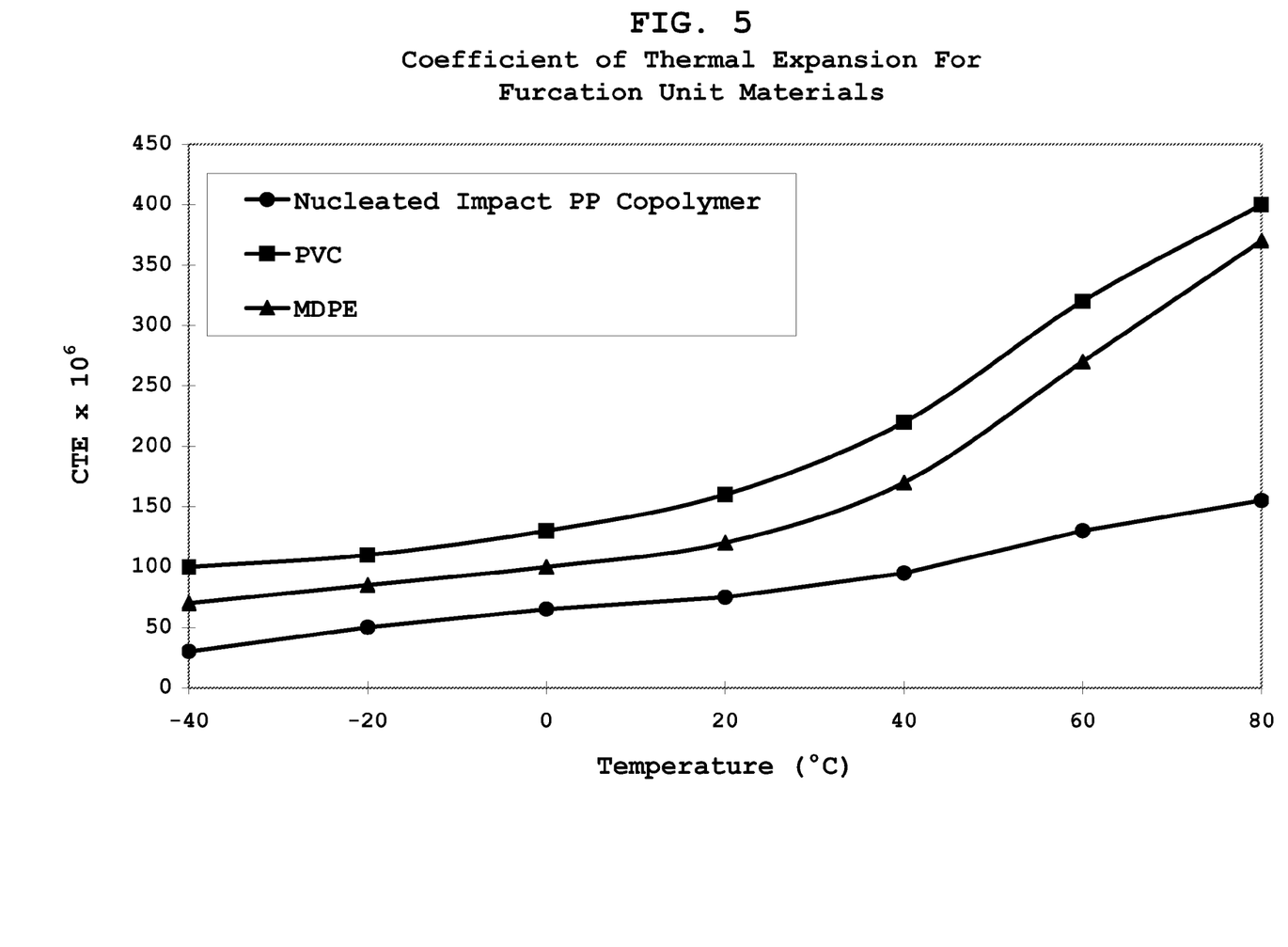
FIG. 5 graphically illustrates coefficient of thermal expansion (CTE) values for a nucleated polypropylene copolymer as compared with polyvinyl chloride (PVC) and polyethylene.

In exemplary embodiments of the invention, the jacket of a furcation leg exhibits a coefficient of thermal expansion of less than about 50 um/m° C. at −40° C. and/or less than about 100 um/m° C. at 23° C. Table 2 (below) and FIG. 5 illustrate the substantial reduction in furcation unit coefficient of thermal expansion for a nucleated polypropylene copolymer as compared with PVC and polyethylene furcation unit jacketing material, respectively.

TABLE 2

| Temperature (° C.) | Nucleated PP Copolymer CTE (μm/m° C.) | PVC CTE (μm/m° C.) | MDPE CTE (μm/m° C.) |
|---|---|---|---|
| −40 | 30 | 100 | 70 |
| −20 | 50 | 110 | 85 |
| 0 | 65 | 130 | 100 |
| 20 | 75 | 160 | 120 |
| 40 | 95 | 220 | 170 |
| 60 | 130 | 320 | 270 |
| 80 | 155 | 400 | 370 |

Figure 6:
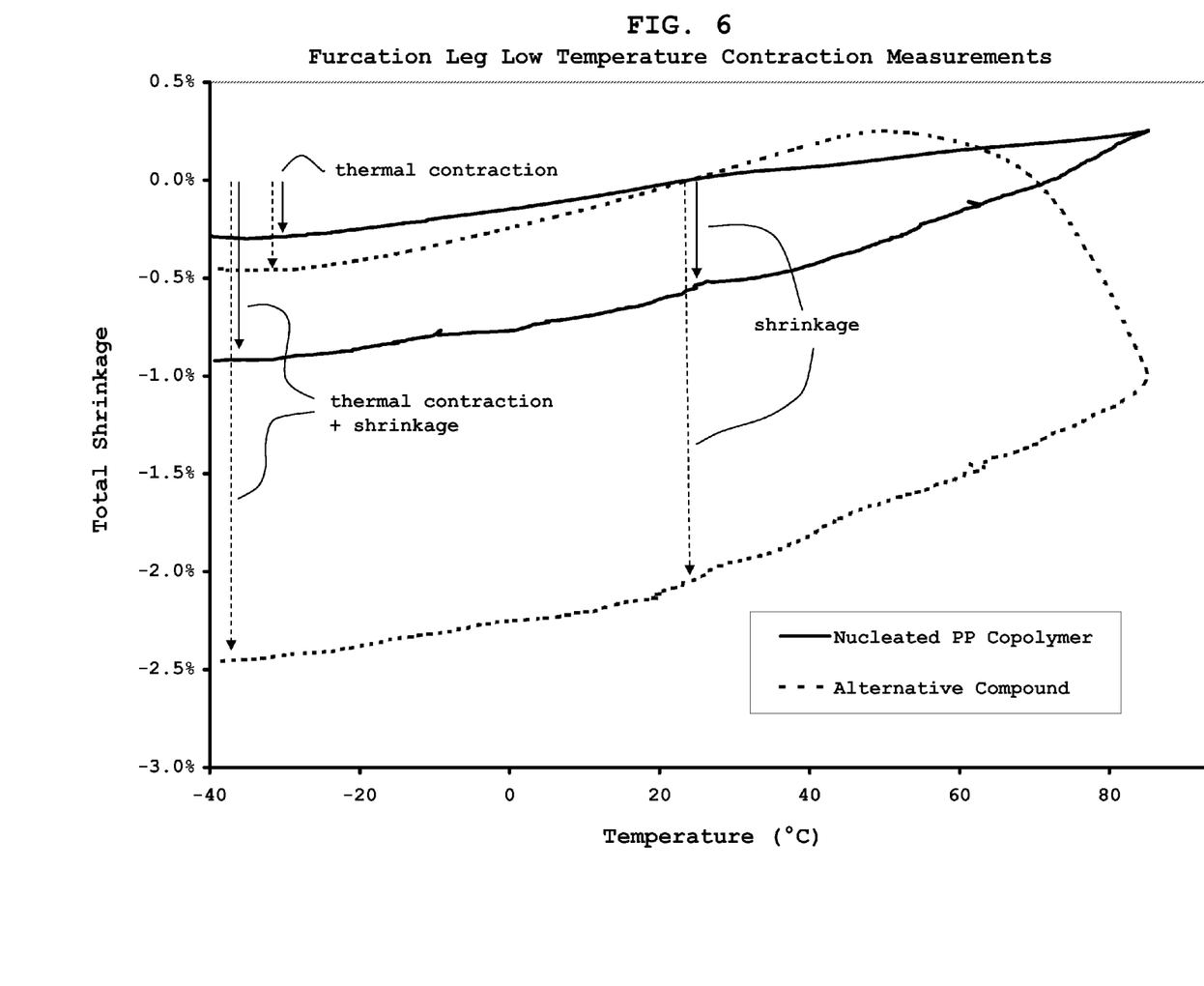
FIG. 6 graphically illustrates total furcation leg shrinkage measurements for a nucleated polypropylene copolymer and an alternative material when cycled from about room temperature to about −40° C. to about +85° C. to about −40° C.

As noted, exemplary polyolefin materials suitable for use in jacket and/or buffer tube of furcation legs 16 are disclosed, for example, in U.S. Pat. No. 5,761,362 (Yang et al.) and U.S. Pat. No. 5,911,023 (Risch et al). FIG. 6 graphically presents total furcation leg shrinkage/contraction measurements for a nucleated polypropylene copolymer material and an alternative material when cycled from about room temperature to about −40° C. to about +85° C. to about −40° C.

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. A cable assembly for transitioning individual optical fibers from a multiple optical fiber cable to connectors, comprising:
a furcation unit for attachment to an end of a fiber optic cable comprising multiple optical fibers, wherein said furcation unit is structured to direct individual optical fibers from a cable to corresponding furcation legs; and
multiple furcation legs, each having an end attached to said furcation unit, capable of receiving at least one optical fiber, each of said furcation legs comprising (i) a buffer tube (ii) strength members surrounding said buffer tube, and (iii) a jacket surrounding said strength members, wherein said buffer tube and/or said jacket of at least one of said furcation legs comprises a nucleated polypropylene-polyethylene copolymer exhibiting a post-extrusion shrinkage of less than about 0.5 percent, and wherein each of said furcation legs exhibits total shrinkage of less than about 2 percent when cycled from +23° C. to −40° C. to +70° C. to −40° C., and wherein at least one of said furcation legs has a tensile rating of at least about 50 pounds ($lb_f$).

2. A cable assembly according to claim 1, wherein each of said furcation legs exhibits total shrinkage of less than about 1.5 percent when cycled from +23° C. to −40° C. to +70° C. to −40° C.

3. A cable assembly according to claim 1, wherein each of said furcation legs exhibits total shrinkage of less than about 1.25 percent when cycled from +23° C. to −40° C. to +70° C. to −40° C.

4. A cable assembly according to claim 3, wherein said buffer tube and said jacket of each of said furcation legs comprises a nucleated polypropylene-polyethylene copolymer exhibiting a post-extrusion shrinkage of less than about 0.3 percent.

5. A cable assembly according to claim 1, wherein said buffer tube and/or said jacket of at least one of said furcation legs exhibit a coefficient of thermal expansion of less than about 50 um/m° C. at −40° C. and/or less than about 100 um/m° C. at 23° C.

6. A cable assembly according to claim 1, wherein each of said furcation legs has a tensile rating of between 50 and 100 pounds ($lb_f$).

7. A cable assembly according to claim 1, wherein at least one of said furcation legs comprises a buffer tube having an outer diameter of 2.0 millimeters or less.

8. A cable assembly according to claim 1, wherein at least one of said furcation legs (i) comprises a nucleated polypropylene-polyethylene copolymer exhibiting a post-extrusion shrinkage of less than about 0.5 percent, (ii) has a tensile rating of at least about 50 pounds ($lb_f$), (iii) comprises a buffer tube having an outer diameter of 2.0 millimeters or less, and (iv) comprises a jacket having an outer diameter of 5.0 millimeters or less.

9. A cable assembly according to claim 1, wherein at least one of said furcation legs surrounds at least one optical fiber.

10. A cable assembly according to claim 1, wherein at least one of said furcation legs does not surround an optical fiber.

11. A cable assembly according to claim 1, wherein each of said furcation legs comprises a water-blocking and/or water-absorbing material.

12. A cable assembly according to claim 1, wherein said strength members comprise aramid material, fiberglass, polyester material, or a combination thereof.

13. A cable assembly according to claim 1, wherein said strength members of each of said furcation legs are impregnated or coated with water-swellable particles.

14. A cable assembly according to claim 1, said jacket of each of said furcation legs comprises a UV-stabilized copolymer.

15. A cable assembly according to claim 1, wherein said buffer tube and said jacket of at least one of said furcation legs comprises a polypropylene-polyethylene copolymer exhibiting a post-extrusion shrinkage of less than about 0.4 percent.

16. A multiple optical fiber cable assembly suitable for outdoor use, comprising:
a fiber optic cable comprising multiple optical fibers;
a furcation unit attached to an end of said cable for directing individual optical fibers from said cable to furcation legs; and
multiple furcation legs, each having an end attached to said furcation unit and receiving at least one of said optical fibers, each of said furcation legs comprising (i) a buffer tube surrounding at least one of said optical fibers, (ii) strength members surrounding said buffer tube, and (iii) a jacket surrounding said strength members, wherein said buffer tube and/or said jacket of at least one of said furcation legs comprises a nucleated polypropylene-polyethylene copolymer exhibiting a post-extrusion shrinkage of less than about 0.5 percent, and wherein each of said furcation legs exhibits total shrinkage of less than about 1 percent when cycled from +23° C. to −40° C. to +70° C. to −40° C., and wherein at least one of said furcation legs has a tensile rating of at least about 50 pounds ($lb_f$).

17. A cable assembly according to claim 16, wherein:
said buffer tube of each of said furcation legs exhibits a post-extrusion shrinkage of less than about 0.5 percent; and
the material forming said jacket of each of said furcation legs exhibits a post-extrusion shrinkage of less than about 0.5 percent.

18. A cable assembly according to claim 16, wherein at least one of said furcation legs has a tensile rating of at least about 75 pounds ($lb_f$).

19. A cable assembly according to claim 16, wherein:
at least one of said furcation legs comprises a buffer tube having an outer diameter of less than about 2 millimeters; and/or
at least one of said furcation legs comprises a jacket having an outer diameter of less than about 5 millimeters.

20. A cable assembly according to claim 16, wherein said buffer tube of each of said furcation legs has an outer diameter of about 2 millimeters and said jacket of each of said furcation legs has an outer diameter of about 4.8 millimeters.

21. A cable assembly according to claim 16, wherein each of said furcation legs surrounds a single optical fiber from said fiber optic cable.

22. A cable assembly according to claim 16, wherein at least one of said furcation legs comprises a water-blocking and/or a water-absorbing material between said buffer tube and said jacket of said furcation leg.

23. A cable assembly according to claim 16, wherein said strength members of each of said furcation legs are impregnated or coated with water-swellable particles.

24. A cable assembly according to claim 16, wherein said jacket of each of said furcation legs comprises a UV-stabilized, nucleated polypropylene copolymer.

25. A cable assembly according to claim 16, comprising at least one ruggedized optical connector attached to an end of at least one of said furcation legs, opposite said furcation unit.

26. A multiple optical fiber cable assembly suitable for outdoor use, comprising:
a fiber optic cable comprising multiple optical fibers;
a furcation unit attached to an end of said cable for directing individual optical fibers from said cable to furcation legs; and
multiple furcation legs, each having an end attached to said furcation unit and receiving at least one of said optical fibers, each of said furcation legs comprising (i) a buffer tube surrounding at least one of said optical fibers, (ii) strength members surrounding said buffer tube, and (iii) a jacket surrounding said strength members, wherein said buffer tube and/or said jacket of at least one of said furcation legs comprises a nucleated polypropylene-polyethylene copolymer exhibiting a post-extrusion shrinkage of less than about 0.5 percent, and wherein at least one of said furcation legs has a tensile rating of at least about 50 pounds ($lb_f$).

27. A cable assembly according to claim 26, wherein each of said furcation legs exhibits total shrinkage of less than about 1.5 percent when cycled from +23° C. to −40° C. to +70° C. to −40° C.

28. A cable assembly according to claim 26, wherein over a temperature range of 70° C. to −40° C., said buffer tube and/or said jacket of at least one of said furcation legs exhibits total shrinkage of less than about 1.0 percent.

29. A cable assembly according to claim 26, wherein:
said buffer tube of each of said furcation legs exhibits a post-extrusion shrinkage of less than about 0.5 percent; and the material forming said jacket of each of said furcation legs exhibits a post-extrusion shrinkage of less than about 0.5 percent.

30. A cable assembly according to claim 26, wherein:
said buffer tube of each of said furcation legs exhibits a coefficient of thermal expansion of less than about 50 um/m° C. at −40° C. and less than about 100 um/m° C. at 23° C.; and/or
the material forming said jacket of each of said furcation legs exhibits a coefficient of thermal expansion of less than about 50 um/m° C. at −40° C. and less than about 100 um/m° C. at 23° C.

31. A cable assembly according to claim 26, wherein each of said furcation legs has a tensile rating of between 50 and 100 pounds ($lb_f$).

32. A cable assembly according to claim 26, wherein each of said furcation legs has a tensile rating of at least about 100 pounds ($lb_f$).

33. A cable assembly according to claim 26, wherein:
at least one of said furcation legs comprises a buffer tube having an outer diameter of 2.0 millimeters or less; and/or at least one of said furcation legs comprises a jacket having an outer diameter of 5.0 millimeters or less.

34. A cable assembly according to claim 26, wherein a water-blocking and/or water-absorbing material is positioned between said buffer tube and said jacket of each of said furcation legs.

35. A cable assembly according to claim 26, wherein said strength members of each of said furcation legs are impregnated or coated with water-swellable particles.

36. A cable assembly according to claim 26, wherein said buffer tube and said jacket of at least one of said furcation legs comprises a nucleated polypropylene-polyethylene copolymer exhibiting a post-extrusion shrinkage of less than about 0.3 percent.

37. A cable assembly according to claim 26, comprising at least one optical connector attached to an end of at least one of said furcation legs, opposite said furcation unit.

38. A cable assembly according to claim 26, wherein each of said furcation legs comprises:
a single optical fiber;
a buffer tube surrounding said optical fiber, said buffer tube comprising a nucleated polypropylene copolymer material, said buffer tube exhibiting a post-extrusion shrinkage of less than about 0.5 percent, a coefficient of thermal expansion of less than about 50 um/m° C. at −40° C. and less than about 100 um/m° C. at 23° C., a total shrinkage of less than about 1 percent over a temperature range of 70° C. to −40° C., and said buffer tube having an outer diameter of about 2 millimeters;
aramid yarn strength members surrounding said buffer tube, said aramid yarn strength members being coated and/or impregnated with a water-swellable material;
a jacket surrounding said strength members, said jacket comprising a UV-stabilized nucleated polypropylene copolymer material, said jacket exhibiting a post-extrusion shrinkage of less than about 0.5 percent, and said jacket having an outer diameter of about 4.8 millimeters; and
an optical connector attached at an end of said furcation leg, opposite said furcation unit.

* * * * *